(12) United States Patent
Kobayashi et al.

(10) Patent No.: US 12,466,960 B2
(45) Date of Patent: Nov. 11, 2025

(54) RESIN COMPOSITION, FILM, AND MULTILAYER STRUCTURE

(71) Applicant: MITSUBISHI CHEMICAL CORPORATION, Tokyo (JP)

(72) Inventors: Ryohei Kobayashi, Tokyo (JP); Takuya Nakajima, Tokyo (JP); Keisuke Takeshita, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 745 days.

(21) Appl. No.: 17/482,885

(22) Filed: Sep. 23, 2021

(65) Prior Publication Data

US 2022/0010143 A1 Jan. 13, 2022

Related U.S. Application Data

(63) Continuation of application No. PCT/JP2020/014351, filed on Mar. 27, 2020.

(30) Foreign Application Priority Data

| Mar. 29, 2019 | (JP) | 2019-067446 |
| Mar. 29, 2019 | (JP) | 2019-067447 |
| Oct. 30, 2019 | (JP) | 2019-197103 |
| Nov. 29, 2019 | (JP) | 2019-216942 |
| Dec. 27, 2019 | (JP) | 2019-237755 |
| Dec. 27, 2019 | (JP) | 2019-237756 |

(51) Int. Cl.

| C09D 5/00 | (2006.01) |
| C08F 16/06 | (2006.01) |
| C08J 5/18 | (2006.01) |
| C08K 5/098 | (2006.01) |
| C09D 7/63 | (2018.01) |
| C09D 101/28 | (2006.01) |
| C09D 129/04 | (2006.01) |

(52) U.S. Cl.
CPC ........... *C09D 5/00* (2013.01); *C08F 16/06* (2013.01); *C08J 5/18* (2013.01); *C09D 7/63* (2018.01); *C09D 101/28* (2013.01); *C09D 129/04* (2013.01); *C08J 2329/04* (2013.01); *C08K 5/098* (2013.01)

(58) Field of Classification Search
CPC ............................................ C09D 5/00
See application file for complete search history.

(56) References Cited

U.S. PATENT DOCUMENTS

| 9,376,545 | B2 | 6/2016 | Okamoto et al. |
| 11,130,322 | B2* | 9/2021 | Murase .................. B32B 27/32 |
| 2003/0157283 | A1 | 8/2003 | Tai et al. |
| 2004/0253463 | A1 | 12/2004 | Inui et al. |
| 2005/0131162 | A1 | 6/2005 | Tanaka et al. |
| 2007/0122557 | A1 | 5/2007 | Oosaki et al. |
| 2008/0070043 | A1 | 3/2008 | Arai et al. |
| 2009/0269592 | A1 | 10/2009 | Hakamata et al. |
| 2010/0189937 | A1 | 7/2010 | Ogawa et al. |
| 2011/0130280 | A1 | 6/2011 | Tsuchimura et al. |
| 2011/0135950 | A1 | 6/2011 | Okamoto et al. |
| 2011/0262731 | A1* | 10/2011 | Mukai .................. D21H 11/16 |
| | | | 428/292.1 |
| 2014/0206798 | A1 | 7/2014 | Oomori et al. |
| 2014/0363661 | A1 | 12/2014 | Kaminaga et al. |
| 2016/0160063 | A1 | 6/2016 | Kaminaga et al. |
| 2018/0015707 | A1 | 1/2018 | Kani |
| 2018/0355146 | A1 | 12/2018 | Nakashima et al. |
| 2019/0283382 | A1 | 9/2019 | Murase et al. |
| 2021/0139693 | A1 | 5/2021 | Fujuda et al. |

FOREIGN PATENT DOCUMENTS

| CN | 101040005 A | 9/2007 |
| CN | 101778878 A | 7/2010 |
| CN | 103842452 A | 6/2014 |
| CN | 104136219 A | 11/2014 |
| CN | 105492551 A | 4/2016 |
| JP | 2001-106920 A | 4/2001 |
| JP | 2001-226553 A | 8/2001 |
| JP | 2002-275214 A | 9/2002 |
| JP | 2002-338821 A | 11/2002 |
| JP | 2003-053909 A | 2/2003 |
| JP | 2003-128804 A | 5/2003 |
| JP | 2003-165945 A | 6/2003 |
| JP | 2005-225078 A | 8/2005 |

(Continued)

OTHER PUBLICATIONS

Marangoni, R.; Ramos, L. P.; Wypych, F. J. Colloid Interface Sci. 2009, 330, 303-309. (Year: 2009).*
Office Action for CN App. No. 202080024889.0, dated Dec. 27, 2022 (w/ translation).
Office Action for EP App. No. 20783890.5, dated Nov. 27, 2023.
Office Action for JP App. No. 2020-058972, dated Dec. 5, 2023 (w/ translation).

(Continued)

*Primary Examiner* — Michael F Pepitone
(74) *Attorney, Agent, or Firm* — Greenblum & Bernstein, P.L.C.

(57) ABSTRACT

A resin composition containing a hydrophilic resin and a metal compound, and satisfies the following expression (1) when being formed into a film:

$$\alpha 1 - \beta 1 \geq 1 \qquad (1)$$

wherein α1 is an average metal atom concentration (%) in a portion of the film in a depth range of 0 to 9 nm from a film surface, and β1 is an average metal atom concentration (%) in a portion of the film in a depth range of 12 to 21 nm from the film surface. The resin composition is excellent in gas barrier property, particularly in oxygen barrier property, in a high humidity environment.

12 Claims, No Drawings

(56) References Cited

FOREIGN PATENT DOCUMENTS

| | | | |
|---|---|---|---|
| JP | 2005-335112 A | 12/2005 | |
| JP | 2006-52305 A | 2/2006 | |
| JP | 2006-514077 A | 4/2006 | |
| JP | 2006-219518 A | 8/2006 | |
| JP | 2007-92052 A | 4/2007 | |
| JP | 2007-313758 A | 12/2007 | |
| JP | 2008-81714 A | 4/2008 | |
| JP | 2008-105273 A | 5/2008 | |
| JP | 2010-13618 A | 1/2010 | |
| JP | 2010-202855 A | 9/2010 | |
| JP | 2011-92837 A | 5/2011 | |
| JP | 2011-136557 A | 7/2011 | |
| JP | 2016-121335 A | 7/2016 | |
| JP | 2016-199744 A | 12/2016 | |
| JP | 2016-221864 A | 12/2016 | |
| JP | 2017-52567 A | 3/2017 | |
| JP | 2017-211082 A | 11/2017 | |
| JP | 2018-89567 A | 6/2018 | |
| JP | 2018-114751 A | 7/2018 | |
| JP | 2018-154714 A | 10/2018 | |
| WO | WO 03/091317 A1 | 11/2003 | |
| WO | WO 2004/064867 A1 | 5/2004 | |
| WO | WO 2009/084191 A1 | 7/2009 | |
| WO | WO 2010/016595 A1 | 2/2010 | |
| WO | WO 2013/042654 A1 | 3/2013 | |
| WO | WO 2013/129515 A1 | 9/2013 | |
| WO | WO-2017110844 A1 * | 6/2017 | ............... B29B 9/12 |
| WO | WO 2017/175775 A1 | 10/2017 | |
| WO | WO-2018101350 A1 * | 6/2018 | ............... B05D 5/00 |

OTHER PUBLICATIONS

Office Action for JP App. No. 2020-058973, dated Dec. 5, 2023 (w/ translation).
Office Action for CN App. No. 202080024889.0, dated Dec. 5, 2023 (w/ translation).
ISR for PCT/JP2020/014351, dated Jun. 16, 2020.
IPRP for PCT/JP2020/014351, dated Sep. 28, 2021.
Supplemental ESR for EP 20783890.5, dated Apr. 7, 2022.
Office Action for JP App. No. 2020-195847, dated Oct. 22, 2024 (w/ translation).
Office Action for JP App. No. 2020-178864, dated Oct. 22, 2024 (w/ translation).
Office Action for JP App. No. 2020-217876, dated Dec. 17, 2024 (w/ translation).
Akiyama, Daisuke, "A study on the migration behavior of cations in bentonite buffer material in the presence of iron corrosion products," Doctoral Thesis, Kyushu University, 2014, pp. 1-4 and 99-103 [cited in JP Office Action (cite 070)].
Yotsuji et al., "Molecular Dynamics Simulations of Physical Properties of Water and Cations in Montmorillonite Interlayer," Clay Science, 58(1):8-25 (2019) [English Abstract; cited in JP Office Action (cite 070)].
Office Action for JP App. No. 2020-217875, dated Jan. 28, 2025 (w/ translation).
Office Action for JP App. No. 2020-178864, dated Mar. 18, 2025 (w/ translation).
Office Action for JP App. No. 2020-058972, dated Jun. 25, 2024 (w/ translation).
Office Action for JP App. No. 2020-058973, dated Jun. 25, 2024 (w/ translation).
Office Action for JP App. No. 2020-217875, dated Jul. 9, 2024 (w/ translation).
Office Action for JP App. No. 2020-217876, dated Jul. 9, 2024 (w/ translation).
Office Action for CN App. No. 202080024889.0, dated Mar. 28, 2024 (w/ translation).

* cited by examiner

RESIN COMPOSITION, FILM, AND MULTILAYER STRUCTURE

RELATED APPLICATIONS

This application is a continuation of International Application No. PCT/JP2020/014351, filed on Mar. 27, 2020, which claims priority to Japanese Patent Application Nos. 2019-067446 and 2019-067447, filed on Mar. 29, 2019, Japanese Patent Application No. 2019-197103, filed on Oct. 30, 2019, Japanese Patent Application No. 2019-216942, filed on Nov. 29, 2019, and Japanese Patent Application Nos. 2019-237755 and 2019-237756, filed on Dec. 27, 2019, the entire contents of each of which being expressly incorporated by reference herein.

TECHNICAL FIELD

The present disclosure relates to a resin composition and, more specifically, to a resin composition which can be used for formation of a film having a higher gas barrier property in a high humidity environment.

BACKGROUND ART

Hydrophilic resins such as polyvinyl alcohol resins are generally excellent in strength, transparency, and gas barrier property. Therefore, the hydrophilic resins are formed into films, which are widely used for various packaging materials, particularly, for foods, chemical agents, and the like that need to be protected from degradation due to oxygen.

However, the hydrophilic resins have a greater number of hydroxyl groups and, hence, are liable to be significantly affected by humidity. Therefore, the hydrophilic resins are liable to suffer from significant deterioration in gas barrier property in a high humidity environment.

PTL 1, for example, discloses a gas barrier film material for a film having an improved gas barrier property. The gas barrier film material contains poorly-water-soluble inorganic particles having an average particle diameter of not greater than 500 nm, and a water-soluble or water-dispersible polymer compound, wherein the poorly-water-soluble particles are ionic crystal particles prepared by a reaction of an inorganic compound essentially containing at least one selected from the group consisting of aluminum, silicon, zinc, zirconium, silver, and tin, or any of their salts with at least one compound selected from the group consisting of an organic acid, an inorganic acid, and their salts.

PTL 2 discloses a gas barrier layer formation composition, which contains a water-soluble polymer, at least one selected from the group consisting of a metal alkoxide, a hydrolysis product of the metal alkoxide, and tin chloride, and a compound represented by a general formula $(R^1Si(OR^2)_3)_n$ (wherein $R^1$ is an organic functional group, and $R^2$ is $CH_3$, $C_2H_5$ or $C_2H_4OCH_3$).

Further, PTL 3 discloses a gas barrier laminate production method, which includes the steps of forming a coating film containing zinc ions, at least one selected from a metal alkoxide and its hydrolysis product, and a water-soluble polymer on a surface of a substrate film or a laminate including the substrate film; and drying the coating film to form a gas barrier layer on the surface.

RELATED ART DOCUMENTS

Patent Documents

PTL 1: JP-A-2002-338821
PTL 2: JP-A-2016-221864
PTL 3: JP-A-2018-089567

SUMMARY

However, the gas barrier films disclosed in PTL 1 to PTL 3 each have an insufficient gas barrier property in the high humidity environment, requiring further improvement.

In view of the foregoing, the present disclosure provides a resin composition which is excellent in gas barrier property in the high humidity environment, particularly in oxygen barrier property in the high humidity environment.

The inventors of the present disclosure found that, where a film formed from a resin composition containing a hydrophilic resin and a metal compound has a higher average metal atom concentration in a film surface portion, the film is excellent in gas barrier property, particularly in oxygen barrier property, in the high humidity environment.

The inventors of the present disclosure further found that, where a coating film formed from a resin composition containing a hydrophilic resin and a metal compound is exposed in the high humidity environment for a longer period of time, the film is imparted with an excellent gas barrier property.

According to a first aspect of the present disclosure, a resin composition is provided, which contains a hydrophilic resin and a metal compound, and satisfies the following expression (1) when being formed into a film:

$$\alpha 1 - \beta 1 \geq 1 \qquad (1)$$

wherein $\alpha 1$ is an average metal atom concentration (%) in a portion of the film in a depth range of 0 to 9 nm from a film surface, and $\beta 1$ is an average metal atom concentration (%) in a portion of the film in a depth range of 12 to 21 nm from the film surface.

According to a second aspect of the present disclosure, a resin composition is provided, which contains a hydrophilic resin and a metal compound, and satisfies the following requirement (A):

(A) When a water contact angle $\alpha 2$ (degree) and a water contact angle $\beta 2$ (degree) of a film formed by casting a 10 wt. % aqueous solution or aqueous dispersion of the resin composition are respectively determined before and after the cast film is allowed to keep still in an environment at 23° C. at 80% RH for one week, the water contact angle $\alpha 2$ (degree) and the water contact angle $\beta 2$ (degree) satisfy the following expression (2):

$$(\beta 2 - \alpha 2) \geq 10 \qquad (2)$$

According to a third aspect of the present disclosure, a resin composition is provided, which contains a hydrophilic resin and a metal compound, and has an oxygen permeability (cc·3 μm/m²·day·atm) satisfying the following expression (3) as measured in an environment at 23° C. at 80% RH, when being formed into a film:

$$\text{Oxygen permeability } (cc \cdot 3 \text{ μm/m}^2 \cdot \text{day} \cdot \text{atm}) \leq 80 \qquad (3)$$

According to a fourth aspect of the present disclosure, a film is provided, which comprises the resin composition according to the first aspect, the resin composition according to the second aspect, or the resin composition according to the third aspect. According to a fifth aspect of the present disclosure, a multilayer structure is provided, which includes at least one layer formed of the film according to the fourth aspect.

The resin composition of the first aspect contains the hydrophilic resin and the metal compound, and satisfies the following expression (1) when being formed into the film:

$$\alpha1-\beta1\geq1 \quad (1)$$

wherein α1 is the average metal atom concentration (%) in the portion of the film in a depth range of 0 to 9 nm from the film surface, and β1 is the average metal atom concentration (%) in the portion of the film in a depth range of 12 to 21 nm from the film surface.

Therefore, the film formed from the resin composition is excellent in gas barrier property, particularly in oxygen barrier property, in the high humidity environment.

The resin composition of the second aspect contains the hydrophilic resin and the metal compound, and satisfies the following requirement (A):

(A) When the water contact angle α2 (degree) and the water contact angle β2 (degree) of the film formed by casting the 10 wt. % aqueous solution or aqueous dispersion of the resin composition are respectively determined before and after the cast film is allowed to keep still in the environment at 23° C. at 80% RH for one week, the water contact angle α2 (degree) and the water contact angle β2 (degree) satisfy the following expression (2):

$$(\beta2-\alpha2)\geq10 \quad (2)$$

Therefore, the film formed from the resin composition is excellent in gas barrier property, particularly in oxygen barrier property, in the high humidity environment.

The resin composition of the third aspect contains the hydrophilic resin and the metal compound, and has the oxygen permeability (cc·3 μm/m²·day·atm) satisfying the following expression (3) as measured in the environment at 23° C. at 80% RH, when being formed into the film:

$$\text{Oxygen permeability } (cc\cdot3\ \mu m/m^2\cdot day\cdot atm)\leq80 \quad (3)$$

Therefore, the film formed from the resin composition is excellent in gas barrier property, particularly in oxygen barrier property, in the high humidity environment.

DESCRIPTION OF EMBODIMENTS

Embodiments of the present disclosure will hereinafter be described specifically. However, it should be understood that the disclosure be not limited to these embodiments.

A resin composition of the present disclosure contains a hydrophilic resin and a metal compound. The components of the resin composition will hereinafter be described.

<Hydrophilic Resin>

Specific examples of the hydrophilic resin include water-soluble resins such as vinyl alcohol resin, polysaccharide, acrylic resin, and polyether resin. These hydrophilic resins may be used alone or in combination.

The hydrophilic resin preferably has the following properties, for example, when being formed into a film.

Where the film is formed from the hydrophilic resin as having a thickness of 30 μm and immersed still in water at 25° C. for two hours, the film preferably has an area change ratio of not less than 105%. The area change ratio may be calculated from the following expression:

$$\text{Area change ratio}(\%) = \frac{\text{Film area after immersion}}{\text{Film area before immersion}} \times 100$$

The specific examples of the hydrophilic resin will hereinafter be described in detail.

[Vinyl Alcohol Resin]

Resins known as ethylene-vinyl alcohol copolymer resins (having an ethylene content of 20 to 60 mol %) are generally excluded as the vinyl alcohol resin. A typical example of the vinyl alcohol resin is polyvinyl alcohol (hereinafter referred to as "PVA") resin.

In general, the PVA resin is preferably an unmodified PVA resin, but may be a modified PVA resin.

The unmodified PVA resin can be typically prepared by polymerizing a vinyl ester monomer, and then saponifying the resulting polymer.

The modified PVA resin can be prepared by saponifying a polymer of the vinyl ester monomer and some other unsaturated monomer, or by post-modifying the unmodified PVA resin.

Examples of the vinyl ester monomer include aliphatic vinyl esters such as vinyl formate, vinyl acetate, vinyl propionate, vinyl valerate, vinyl butyrate, vinyl isobutyrate, vinyl pivalate, vinyl caprate, vinyl laurate, vinyl stearate, vinyl versatate, and vinyl trifluoroacetate, and aromatic vinyl esters such as vinyl benzoate. The aliphatic vinyl esters preferably have a carbon number of 3 to 20, more preferably 4 to 10, particularly preferably 4 to 7. Vinyl acetate is especially preferred. These vinyl esters are typically each used alone or, as required, a plurality of vinyl esters may be selected from these vinyl esters to be used in combination.

Examples of the other unsaturated monomer include: olefins such as ethylene, propylene, isobutylene, α-octene, α-dodecene, and α-octadecene; unsaturated acids such as acrylic acid, methacrylic acid, crotonic acid, maleic acid, maleic anhydride, and itaconic acid, salts of these unsaturated acids, and monoalkyl and dialkyl esters of these unsaturated acids; nitriles such as acrylonitrile and methacrylonitrile; amides such as acrylamide and methacrylamide; olefin sulfonic acids such as ethylenesulfonic acid, allylsulfonic acid, and methallylsulfonic acid, and salts of these olefin sulfonic acids; alkyl vinyl ethers; N-acrylamide methyl trimethylammonium chloride, allyl trimethylammonium chloride, dimethylallyl vinyl ketone, N-vinylpyrrolidone, vinyl chloride, and vinylidene chloride; polyoxyalkylene (meth)allyl ethers such as polyoxyethylene (meth)allyl ether and polyoxypropylene (meth)allyl ether; polyoxyalkylene (meth)acrylates such as polyoxyethylene (meth)acrylate and polyoxypropylene (meth)acrylate; polyoxyalkylene (meth)acrylamides such as polyoxyethylene (meth)acrylamide and polyoxypropylene (meth)acrylamide; polyoxyethylene (1-(meth)acrylamide-1,1-dimethylpropyl) ester, polyoxyethylene vinyl ether, and polyoxypropylene vinyl ether; and polyoxyethylene allylamine, polyoxypropylene allylamine, polyoxyethylene vinylamine, and polyoxypropylene vinylamine. These may be used alone or in combination. The term "(meth)allyl" means allyl or methallyl, and the term "(meth)acrylate" means acrylate or methacrylate. The term "(meth)acryl" means acryl or methacryl.

The PVA resin may be prepared by a known polymerization method, a known saponification method, and a known post-modification method.

The amount of the other unsaturated monomer to be introduced and the modification degree for the post modification are properly determined according to the type of the monomer, and are each typically not greater than 15 mol %, particularly not greater than 10 mol %. If the introduced amount and the modification degree are excessively great, the PVA resin tends to have a reduced crystallinity, thereby reducing the gas barrier property of a film formed from the resin composition.

The PVA resin typically has an average saponification degree of 70 to 100 mol %, preferably 80 to 100 mol %, particularly preferably 85 to 100 mol %, more preferably 90 to 99.99 mol %. If the average saponification degree is lower than 70 mol %, the oxygen permeability tends to be increased in the high humidity environment. The average saponification degree is measured in conformity with JIS K6726.

The PVA resin typically has an average polymerization degree of 100 to 4,000, preferably 200 to 3,000, particularly preferably 250 to 2,500. If the average polymerization degree is excessively low, mechanical properties such as film strength tend to be poorer. If the average polymerization degree is excessively high, it will be difficult to solubilize the PVA resin in water and hence to handle the PVA resin. The average polymerization degree is measured in conformity with JIS K6726.

Two or more PVA resins which are different in modification species, modification degree, average saponification degree, and average polymerization degree may be used in combination as the PVA resin.

[Polysaccharide]

Examples of the polysaccharide include starch, and cellulose.

Examples of the starch include natural starches such as corn starch and potato starch, and modified starches such as etherified starch, esterified starch, crosslinked starch, grafted starch, baked dextrin, enzyme-modified dextrin, gelatinized starch, and oxidized starch.

Examples of the cellulose include carboxymethyl cellulose, methyl cellulose, ethyl cellulose, hydroxymethyl cellulose, hydroxypropylmethyl cellulose, hydroxyethyl cellulose, hydroxyethylmethyl cellulose, hydroxypropyl cellulose, nitrocellulose, and cationic cellulose, and metal salts such as sodium salts of these celluloses.

[Acrylic Resin]

Examples of the acrylic resin include polyacrylamide, polyacrylic acid, and metal salts such as sodium salts of the polyacrylic acid.

[Polyether Resin]

Examples of the polyether resin include polyethylene glycol and polypropylene glycol.

For the excellent gas barrier property, particularly for the excellent oxygen barrier property, in the high humidity environment, the vinyl alcohol resin and the polysaccharide are preferred as the hydrophilic resin. The PVA resins, the modified starches (particularly the soluble starches), hydroxypropylmethyl cellulose are more preferred, and the unmodified PVA resin is most preferred.

The hydrophilic resin is preferably a main component of the resin composition of the present disclosure, and the proportion of the hydrophilic resin is typically not less than 80 wt. %, preferably not less than 90 wt. %, particularly preferably not less than 95 wt. %, based on the overall amount of the resin composition. The upper limit of the proportion of the hydrophilic resin is typically 99.99 wt. %.

Particularly, the PVA resin is preferably the main component of the resin composition of the present disclosure, and the proportion of the PVA resin is typically not less than 80 wt. %, preferably not less than 90 wt. %, particularly preferably not less than 95 wt. %, based on the overall amount of the resin composition. The upper limit of the proportion of the PVA resin is typically 99.99 wt. %.

[Metal Compound]

The metal compound preferably has a lamellar structure including layers of a specific structural unit spaced a specific interfacial distance from each other. For example, the metal compound has a lamellar structure including layers of a metal complex spaced a specific interfacial distance from each other.

Exemplary metal species of the metal compound include Na, K, Ca, Mg, Si, Al, Ti, Cr, Mn, Fe, Co, Ni, Cu, and Zn. These metal species may be contained alone or in combination. Particularly, Zn is preferred for the excellent gas barrier property, particularly for the excellent oxygen barrier property, in the high humidity environment.

The metal compound is prepared from a compound containing at least one metal selected from the group consisting of Na, K, Ca, Mg, Si, Al, Ti, Cr, Mn, Fe, Co, Ni, Cu, and Zn (hereinafter referred to as "metal-containing material compound") by a method to be described later.

More specifically, the structural unit of the metal compound is a structural unit containing the metal, a hydroxy ligand, and an anionic ligand other than the hydroxy ligand, preferably a structural unit containing the metal, the hydroxy ligand, and the anionic ligand other than the hydroxy ligand and represented by the following chemical formula (4):

$$M_a(OH)_b A^{n-}{}_{(2a-b)/n} \qquad (4)$$

wherein M is the metal species, A is an anionic ligand having a valence of n- and excluding the hydroxy ligand and O (oxo ligand), n is an integer not less than 1, and a and b are numbers greater than zero and satisfy an expression a/b=0.1 to 10.

In the above chemical formula (4), examples of the metal species M include Na, K, Ca, Mg, Si, Al, Ti, Cr, Mn, Fe, Co, Ni, Cu, and Zn, which may be contained alone or in combination. For the excellent gas barrier property, particularly for the excellent oxygen barrier property, in the high humidity environment, Al, Si, Mg, Ni, Co, and Zn are preferred, and Ni, Co, and Zn are particularly preferred. Especially, Zn is preferred.

In the above chemical formula (4), examples of the anionic ligand A include RO (alkoxy ligand), ROCO (carboxylate ligand), $CO_3$, $NO_3$, $SO_3$, $PO_4$, $BO_3$, F, Br, and Cl (wherein R is an alkyl chain which is generally represented by a chemical formula $C_mH_{2m+1}$ (m=1 to 20) and may have a functional group such as OH group as long as the effects of the present disclosure are not impaired). However, O (oxo ligand) is excluded as the anionic ligand A. These anionic ligands may be contained alone or in combination. From the viewpoint of interaction between the metal compound and the hydrophilic resin, $NO_3$, Cl, RO, and ROCO are preferred, and ROCO is particularly preferred. Especially, $CH_3OCO$ is preferred.

The metal compound may contain a water molecule.

The metal compound preferably has a major peak at 2θ=2 to 15°, more preferably 2θ=2 to 9°, particularly preferably at 2θ=3 to 8°, in an X-ray diffraction pattern as measured by wide angle X-ray diffraction using CuKα radiation.

The wide angle X-ray diffraction is performed under the following conditions:

[Measurement Conditions]

Apparatus: D8 DISCOVER (available from Bruker Japan Co., Ltd.)
Detector: Two-dimensional detector VANTEC-500 (available from Bruker Japan Co., Ltd.)
Voltage: 50 kV
Electric current: 100 mA
Camera length: 100 mm
Measurement method: Reflection method
Integration period: 30 minutes
Wavelength: CuKα radiation (with Kα1 and Kα2 not separated)
Detector position: 2θ=10°
X-ray incident angle: θ=0.3°

Conditions for one-dimensional integration in 2θ direction: 2θ=0 to 35°, Azimuthal angle (chi)=−95 to −85°

One-dimensional integration in azimuthal direction: Azimuthal angle (chi)=−180 to 0°

The one-dimensional integration in the azimuthal direction is performed with a 1.0° range, so that a peak having the highest diffraction intensity appears at 2θ=2 to 15°. At this time, where a peak is observed in an azimuthal angle range of −180 to 0°, it is determined that a diffraction peak is observed at 2θ=2 to 15°. Where a diffraction peak is observed at 2θ=6.8°, for example, the one-dimensional integration in the azimuthal direction is performed for 2θ=6.0 to 7.0°. At this time, if a peak is observed in an azimuthal angle range of −180 to 0°, it may be determined that a diffraction peak is observed at 2θ=2 to 15°.

The interlayer distance (the distance between the layers) of the metal compound is preferably 0.01 to 50 nm, more preferably 0.1 to 30 nm, to ensure proper interaction of the metal compound with molecules of the hydrophilic resin and water molecules. The interlayer distance of the metal compound can be calculated from the Bragg's equation based on the diffraction position of a highest-intensity peak in the range of 2θ=2 to 15° as analyzed by the X-ray diffraction method.

The lamellar structural unit of the separated layers of the metal compound preferably has a molecular weight of 100 to 10,000, particularly preferably 200 to 2,000, to ensure the proper interaction with the hydrophilic resin molecules.

The lamellar structural unit is preferably hydrophilic to ensure the proper interaction with the hydrophilic resin molecules.

It is preferred that the lamellar structural unit is not decomposed even if being allowed to keep still in an environment at 20° C. at 90% RH for 1,000 hours.

A specific example of the metal compound is a lamellar compound such as containing Zn as the metal species. For the excellent gas barrier property, particularly for the excellent oxygen barrier property, in the high humidity environment, a layered basic zinc compound represented by a chemical formula $Zn_5(OH)_8(CH_3CO_2)_2 \cdot 2H_2O$ is preferred.

In the present disclosure, the metal compound and the hydrophilic resin interact with each other, so that the polarity of the hydrophilic resin is increased. This supposedly ensures the excellent gas barrier property, particularly the excellent oxygen barrier property, in the high humidity environment.

The amount of the metal compound contained in the resin composition of the present disclosure is typically 0.01 to 20 wt. %, preferably 0.01 to 10 wt. %, more preferably 0.1 to 8 wt. %, particularly preferably 0.2 to 4 wt. %, on a metal basis based on 100 parts by weight of the hydrophilic resin. The amount of the metal compound contained in the resin composition of the present disclosure is typically 0.01 to 20 wt. %, preferably 0.01 to 10 wt. %, more preferably 0.1 to 8 wt. %, particularly preferably 0.2 to 4 wt. %, on a metal basis based on the amount of the resin composition. If the amount of the metal compound is excessively small, the gas barrier property, particularly the oxygen barrier property, in the high humidity environment tends to be poorer. If the amount of the metal compound is excessively great, the resin composition tends to be whitened to have a lower transparency when being formed into a film.

Where the resin composition contains a plurality of metal compounds having different metal species, the amount of the metal compound is defined as the total amount of the metal compounds contained in the resin composition.

The amount of the metal compound can be determined by a standard addition method using ICP-MS.

The metal compound can be prepared, for example, by a method (I) in which the metal-containing material compound is allowed to react in the presence of a base, or a method (II) in which the metal-containing material compound is allowed to react by heating.

The metal-containing material compound to be used in the aforementioned methods may be, for example, an organic acid metal salt or an inorganic metal salt.

Examples of an organic acid moiety of the organic acid metal salt include monovalent carboxylic acids such as acetic acid, divalent carboxylic acids such as succinic acid, oxalic acid, and tartaric acid, and trivalent and higher-valent carboxylic acids such as citric acid and ethylenediaminetetraacetic acid, which may be used alone or in combination. The organic acid metal salt may be a hydrate or may be an anhydride.

For the excellent gas barrier property, particularly for the excellent oxygen barrier property, in the high humidity environment, metal salts of the monovalent carboxylic acids are preferred, and metal salts of acetic acid are particularly preferred as the organic acid metal salt. Especially, zinc acetate or its hydrate is preferred.

Examples of the inorganic metal salt include fluorides, chlorides, bromides, iodides, and oxo acid salts of the metals, which may be used alone or in combination. The inorganic metal salt may be a hydrate or may be an anhydride.

For the excellent gas barrier property, particularly for the excellent oxygen barrier property, in the high humidity environment, the chlorides and the oxo acid salts of the metals are preferred, and zinc chloride and zinc nitrate, and their hydrates are particularly preferred as the inorganic metal salt.

The methods will hereinafter be described in detail.

[Method (I)]

In the method (I), the metal-containing material compound is allowed to react in the presence of the base.

Examples of the base to be used in the method (I) include hydroxides of alkali metals and alkali earth metals. Of these, the alkali metal hydroxides are preferred because of their higher reactivity with the metal-containing material compound, and sodium hydroxide is particularly preferred.

The metal-containing material compound is typically mixed with the base in a solution thereof, and allowed to react with the base in the solution.

The method of mixing the metal-containing material compound with the base is not particularly limited, but examples of the method include a method in which a solution prepared by dissolving the metal-containing material compound in a solvent and a solution prepared by dissolving the base in a solvent are mixed together, and a method in which a slurry prepared by dispersing the metal-containing material compound in a solvent and a solution prepared by dissolving the base in a solvent are mixed together. Particularly, the method in which the solution of the metal-containing material compound and the solution of the base are mixed together is preferred from the viewpoint of reaction efficiency. Where the organic acid metal salt is used as the metal-containing material compound, a method in which a solution prepared by dissolving the organic acid metal salt in a solvent is added to and mixed with the solution of the base is preferred. Where the inorganic metal salt is used as the metal-containing material compound, a method in which the solution of the base is added to and mixed with a solution prepared by dissolving the inorganic metal salt in a solvent is preferred.

The solvents in which the metal-containing material compound and the base are dissolved are not particularly limited, as long as the metal-containing material compound and the base can be dissolved therein. Examples of the solvents include water, and C1 to C5 lower alcohols such as methanol, ethanol, 1-propanol, 2-propanol, 1-butanol, and 2-butanol, which may be used alone or in combination. Of these, water is preferred because it ensures easier post treatment.

The concentration of the metal-containing material compound in the solution prepared by dissolving the metal-containing material compound in the solvent is typically 0.5 to 3 mol/L, preferably 1 to 2 mol/L.

The concentration of the base in the solution prepared by dissolving the base in the solvent is typically 0.01 to 100 mol/L, preferably 0.1 to 30 mol/L, particularly preferably 1 to 10 mol/L. If the concentration of the metal-containing material compound and the concentration of the base are much lower than the aforementioned ranges, the reaction tends to insufficiently proceed. If the concentration of the metal-containing material compound and the concentration of the base are much higher than the aforementioned ranges, a side reaction tends to occur.

The molar ratio between the metal-containing material compound and the base ((metal-containing material compound):(base)) is typically 0.5:2 to 2:0.5, preferably 0.8:1.5 to 1.5:0.8, particularly preferably 0.9:1.2 to 1:1. If the molar ratio falls outside the aforementioned ranges, the reaction tends to insufficiently proceed.

The reaction between the metal-containing material compound and the base is typically allowed to proceed at a pH of 4 to 9, preferably 5 to 8. If the pH is much lower than the aforementioned ranges, the reaction tends to insufficiently proceed. If the pH is much higher than the aforementioned ranges, the metal compound generated by the reaction tends to be decomposed. The pH is controlled by adjusting the amount of the solution of the metal-containing material compound and the amount of the solution of the base to be used.

The reaction is typically allowed to proceed at a temperature of 15° C. to 60° C., preferably 20° C. to 40° C. If the reaction temperature is excessively low, the reaction tends to insufficiently proceed. If the reaction temperature is excessively high, the metal-containing material compound tends to be thermally decomposed, making it impossible to provide the intended metal compound.

The reaction period is typically 0.5 to 5 hours, preferably 1 to 3 hours. The reaction pressure may be an ordinary pressure.

The metal compound prepared through the reaction is in the form of precipitate. The metal compound thus prepared may be used as it is, but is preferably refined by washing, grinding and/or the like before use.

[Method (II)]

In the method (II), the metal-containing material compound is allowed to react by heating.

In the method (II), a solution prepared by dissolving the metal-containing material compound in a solvent is typically heated while being stirred.

Examples of the solvent in which the metal-containing material compound is dissolved include those described above as the solvents to be used in the method (I). Particularly, water and the alcohols are preferred, and water is especially preferred.

For the reaction, the solution may be typically heated to a temperature of 20° C. to 100° C., preferably 50° C. to 95° C., particularly preferably 70° C. to 90° C. If the reaction temperature is excessively low, the reaction tends to insufficiently proceed. If the reaction temperature is excessively high, the metal-containing material compound tends to be thermally decomposed, making it impossible to provide the intended metal compound.

The reaction period is typically 0.1 to 100 hours, preferably 0.5 to 30 hours, particularly preferably 1 to 10 hours. The reaction pressure may be an ordinary pressure.

The metal compound prepared through the reaction is in the form of precipitate. The metal compound thus prepared may be used as it is, or may be refined by washing, grinding and/or the like before use.

The term "metal compound" generally means, for example, a metal salt, a metal oxide, a metal complex, a metal, an alloy or the like. In contrast, as described above, the metal compound prepared by any of the aforementioned methods is the lamellar metal compound having the lamellar structure including the layers of the specific structural unit represented by the chemical formula (4) and spaced the specific interfacial distance from each other. Where the hydrophilic resin molecules and water molecules are present around the metal compound, therefore, the layers of the metal compound are separated from each other, and the resulting minute lamellar structural unit interacts with the hydrophilic resin on a molecular basis. This supposedly ensures the excellent gas barrier property, particularly the excellent oxygen barrier property.

[Other Ingredients]

Additives to be generally blended in resin compositions may be added to the resin composition of the present disclosure, as long as the effects of the present disclosure are not impaired. Examples of the additives include heat stabilizer, antioxidant, antistatic agent, colorant, UV absorber, lubricant, plasticizer, light stabilizer, surfactant, antibacterial agent, desiccant, antiblocking agent, flame retarder, crosslinking agent, curing agent, foaming agent, crystal nucleating agent, antifogging agent, biodegradation additive, silane coupling agent, and oxygen absorber, which may be used alone or in combination.

The resin composition of the present disclosure may be prepared, for example, by mixing together the hydrophilic resin, the metal compound, and some other optional ingredients.

Alternatively, the resin composition of the present disclosure may be prepared, for example, by blending the hydrophilic resin, the metal-containing material compound, and a solvent, and heating and stirring the resulting mixture. In this method, the metal-containing material compound reacts in the solvent to be changed in structure, whereby the metal compound is generated.

The amount of the metal-containing material compound is typically 0.01 to 20 parts by weight, preferably 0.01 to 10 parts by weight, more preferably 0.1 to 8 parts by weight, particularly preferably 0.2 to 5 parts by weight, on a metal basis based on 100 parts by weight of the hydrophilic resin.

The solvent is not particularly limited, as long as the hydrophilic resin can be dissolved therein. Water is typically used as the solvent. In order to reduce a period required for drying a film formed from the resin composition, a C1 to C5 lower alcohol such as methanol, ethanol, propanol, n-butanol or isopropanol may be used, as long as the hydrophilic resin can be dissolved therein.

The amount of the solvent is typically 100 to 9,900 parts by weight, preferably 400 to 1,900 parts by weight, based on 100 parts by weight of the hydrophilic resin.

The blending order of the hydrophilic resin, the metal-containing material compound, and the solvent is not particularly limited, but these ingredients may be blended simultaneously or sequentially. From the viewpoint of the reactivity, it is particularly preferred to blend the hydrophilic resin and the metal-containing material compound in the solvent.

The heating temperature is typically 20° C. to 100° C., preferably 40° C. to 95° C., particularly preferably 80° C. to 95° C. If the heating temperature is excessively low, the hydrophilic resin tends to be insufficiently dissolved in the solvent. If the heating temperature is excessively high, the metal-containing material compound tends to be decomposed.

The reaction period is typically 0.5 to 5 hours, preferably 1 to 4 hours, particularly preferably 2 to 3 hours. If the reaction period is excessively short, the reaction tends to insufficiently proceed. If the reaction period is excessively long, it will be impossible to improve the reaction yield, resulting in poorer economy.

The pressure during the heating may be an ordinary pressure.

<Resin Composition>

According to one embodiment of the present disclosure, the resin composition contains the hydrophilic resin and the metal compound, and satisfies the following expression (1) when being formed into a film:

$$\alpha 1 - \beta 1 \geq 1 \quad (1)$$

In the above expression (1), $\alpha 1$ is an average metal atom concentration (%) in a portion of the film in a depth range of 0 to 9 nm from a film surface, and $\beta 1$ is an average metal atom concentration (%) in a portion of the film in a depth range of 12 to 21 nm from the film surface.

In the resin composition according to the embodiment of the present disclosure, a difference $\alpha 1 - \beta 1$ is required to be not less than 1, preferably not less than 2, more preferably not less than 3. If the difference $\alpha 1 - \beta 1$ is less than 1, the gas barrier property is liable to be poorer in the high humidity environment. The upper limit of the difference $\alpha 1 - \beta 1$ is typically 50.

The average metal atom concentrations are each determined under the following conditions with the use of an X-ray photoelectron spectrometer.

[Measurement Conditions for X-Ray Photoelectron Spectrometer]

Apparatus: JPS-9030 (available from NDK Inc.)
Excitation X-ray source: Non-monochromatic AlKa with an output of 12 kV, 25 mA (300 W)
Analyzer mode: CAE mode (constant energy resolution mode)
Resolution EP: 50 energy steps with 1 eV
EP: 30 energy steps with 2 eV
Analysis area: $\phi 6$ mm The metal element for which the average metal atom concentration is measured by means of the X-ray photoelectron spectrometer is preferably derived from the metal compound.

In the embodiment of the present disclosure, the film formed from the resin composition has a higher average metal atom concentration in the film surface portion to be thereby imparted with an excellent gas barrier property, particularly an excellent oxygen barrier property, in the high humidity environment. To provide the resin composition having such a feature, the resin composition is allowed to keep still in the high humidity environment. It is particularly preferred to allow the film containing the resin composition to keep still in the high humidity environment.

According to another embodiment of the present disclosure, the resin composition contains the hydrophilic resin and the metal compound, and satisfies the following requirement (A):

(A) When a water contact angle $\alpha 2$ (degree) and a water contact angle $\beta 2$ (degree) of a film formed by casting a 10 wt. % aqueous solution or aqueous dispersion of the resin composition are respectively determined before and after the cast film is allowed to keep still in an environment at 23° C. at 80% RH for one week, the water contact angle $\alpha 2$ (degree) and the water contact angle $\beta 2$ (degree) satisfy the following expression (2):

$$(\beta 2 - \alpha 2) \geq 10 \quad (2)$$

A difference $(\beta 2 - \alpha 2)$ between the water contact angles before and after the keep-still treatment is typically not less than 10, preferably not less than 15, more preferably not less than 20, for the excellent gas barrier property, particularly for the excellent oxygen barrier property, in the high humidity environment. The water contact angles are each determined by dropping 2 μL of distilled water on the cast film to form a water droplet on the cast film at 23° C. at 50% RH and measuring the contact angle of the water droplet with respect to the surface of the cast film by means of a contact angle meter (DropMaster 500 available from Kyowa Interface Science Co., Ltd.) ten times, and averaging the ten measurements.

The water contact angle after the keep-still treatment is typically not less than 60 degrees, preferably not less than 70 degrees, particularly preferably not less than 75 degrees, for the excellent gas barrier property, particularly for the excellent oxygen barrier property, in the high humidity environment.

According to further another embodiment of the present disclosure, the resin composition contains the hydrophilic resin and the metal compound, and has an oxygen permeability (cc·3 μm/m²·day·atm) satisfying the following expression (3) as measured in an environment at 23° C. at 80% RH, when being formed into a film:

$$\text{Oxygen permeability } (cc \cdot 3 \text{ μm/m}^2 \cdot \text{day} \cdot \text{atm}) \leq 80 \quad (3)$$

The oxygen permeability is preferably not greater than 80 cc·3 μm/m²·day·atm, more preferably not greater than 70 cc·3 μm/m²·day·atm, still more preferably not greater than 55 cc·3 μm/m²·day·atm, more preferably not greater than 40 cc·3 μm/m²·day·atm, still more preferably not greater than 35 cc·3 μm/m²·day·atm, more preferably not greater than 30 cc·3 μm/m²·day·atm, still more preferably not greater than 25 cc·3 μm/m²·day·atm, more preferably not greater than 20 cc·3 μm/m²·day·atm, particularly preferably not greater than 10 cc·3 μm/m²·day·atm, as measured in the environment at 23° C. at 80% RH. The lower limit of the oxygen permeability is typically 0 cc·3 μm/m²·day·atm. The oxygen permeability can be measured by means of an oxygen permeability measurement apparatus.

<Film Containing Resin Composition>

The film containing the resin composition of the present disclosure is formed from a composition containing the resin composition described above, preferably from the resin composition.

Exemplary film forming methods include a method using a solution or a dispersion (coating liquid) of the resin composition of the present disclosure, and a method in which pellets of the composition containing the resin composition of the present disclosure are melt-formed by means of an extruder. Particularly, the method using the solution or the dispersion (coating liquid) of the resin composition is preferred. Where the coating liquid is to be used, the coating liquid typically has a solid concentration of 0.5 to 30 wt. %, preferably 5 to 20 wt. %.

Exemplary coating liquid preparation methods include a method in which all the ingredients are simultaneously fed to and mixed together in a solvent, and a method in which a solution is prepared by dissolving some of the ingredients in a solvent, and the other ingredients are added to and mixed with the solution. Particularly, a method in which a solution is prepared by dissolving the hydrophilic resin in a solvent, and the other ingredients are added to and mixed with the solution is preferred for working efficiency.

In the metal compound preparation methods described above, the hydrophilic resin is preferably dissolved in the solvent during the reaction of the metal-containing material compound. For the working efficiency, the hydrophilic resin is preferably dissolved in the solvent in the metal compound preparation method (II).

Usable examples of the solvent include those described for the preparation of the metal compound. Particularly, water is preferred.

Examples of the film forming methods include known methods such as melt extrusion method, endless belt method, drum method, coating method, and other casting methods. Of these, the casting methods are preferred, and the coating method is particularly preferred.

Examples of the coating method include known methods such as bar coater method, roll coating method, die coating method, Gravure coating method, comma coating method, and screen printing method.

After the coating, the resulting coating film is dried, for example, at 60° C. to 105° C. for 0.5 to 10 minutes with heating. Thus, the film of the resin composition can be produced. As required, the film may be stretched by uniaxial stretching method or biaxial stretching method.

The film may be provided in the form of a single layer structure film or may be provided in the form of a multilayer structure. The multilayer structure preferably includes at least one layer of the film. The multilayer structure may include a plurality of such films laminated together, or may include such a film laminated on a base film of some other base resin.

The film containing the resin composition of the present disclosure typically has a thickness of 0.1 to 200 µm, preferably 0.2 to 100 µm, particularly preferably 0.3 to 50 µm. Where the formed film is provided in the form of the multilayer structure, the film thickness is the total thickness of all the films each containing the resin composition.

Examples of the base resin include: (unmodified) polyolefin resins including polyethylene resins such as linear low-density polyethylenes, low-density polyethylenes, very-low-density polyethylenes, medium-density polyethylenes, high-density polyethylenes, ethylene-propylene (block and random) copolymers, and ethylene-α-olefin (C4 to C20 α-olefin) copolymers, polypropylene resins such as polypropylenes and propylene-α-olefin (C4 to C20 α-olefin) copolymers, polybutenes, polypentenes, and polycycloolefin resins (polymers having a cycloolefin structure in a main chain and/or a side chain thereof); polyolefin resins in a broader sense including modified olefin resins such as unsaturated carboxyl-modified polyolefin resins obtained by graft-modifying any of the aforementioned polyolefin resins with an unsaturated carboxylic acid or an unsaturated carboxylic acid ester; and ionomers, ethylene-vinyl acetate copolymers, ethylene-acrylic acid copolymers, ethylene-acrylate copolymers, polyester resins, polyamide resins (including polyamide copolymers), polyvinyl chlorides, polyvinylidene chlorides, acrylic resins, polystyrenes, vinyl ester resins, polyester elastomers, polyurethane elastomers, polystyrene elastomers, halogenated polyolefins such as chlorinated polyethylenes and chlorinated polypropylenes, and aromatic and aliphatic polyketones. These may be used alone or in combination. A base film formed of any of these base resins may be subjected to a surface treatment such as corona treatment.

As described above, the film containing the resin composition of the present disclosure is allowed to keep still in the high humidity environment, whereby the film satisfies the above expressions (1) and (2) and, hence, is imparted with an excellent gas barrier property, particularly an excellent oxygen barrier property, in the high humidity environment. There is no clear principle for this effect, but it is supposed that, by allowing the film to keep still in the high humidity environment, the hydrophilic resin molecules are plasticized, and the metal compound dispersed in the film interacts with the hydrophilic resin or is locally present in the surface of the film.

In the present disclosure, the high humidity environment means an environment at 20±5° C. at 90±10% RH.

The period during which the film is allowed to keep still is typically not shorter than 70 hours, preferably not shorter than 100 hours, more preferably not shorter than 150 hours. The upper limit of the keep-still period is typically 1,000 hours.

The film containing the resin composition of the present disclosure is highly transparent, and the transparency of the film is significantly excellent as compared with a film containing an inorganic lamellar compound or a filler. Specifically, the film containing the resin composition of the present disclosure preferably has a haze of not greater than 1%, more preferably not greater than 0.6%, still more preferably not greater than 0.3%, particularly preferably not greater than 0.2%. The haze is a HAZE value measured in conformity with JIS K7361-1. For example, ten test samples each having a size of 50 mm×50 mm are cut out of the film, and the haze values of the ten test samples are measured by a haze meter (NDH-4000 available from Nippon Denshoku Industries Co., Ltd.) and averaged. The average haze value is defined as the haze (%).

The resin composition of the present disclosure and the film containing the resin composition are useful for packaging materials, and can be advantageously used for packaging materials, particularly, for foods, pharmaceutical products, and the like.

EXAMPLES

The embodiments of the present disclosure will hereinafter be described more specifically by way of examples thereof. However, it should be understood that the present disclosure be not limited to the examples within the scope of the present disclosure.

In the following examples, "parts" and "%" are based on weight, unless otherwise specified.

First Examples

Prior to implementation of First Examples, the following hydrophilic resins were prepared.

[Hydrophilic Resins]
[PVA Resin]
PVA (1): Unmodified PVA resin having an average polymerization degree of 300 and an average saponification degree of 99 mol %
[Polysaccharide]
Hydroxypropylmethyl cellulose (HPMC) (HYPROMELLOSE AW-4 available from Mitsubishi Chemical Foods Corporation)

Example 1-1

First, 100 parts of the PVA (1) and 1 part of $Zn(CH_3COO)_2 \cdot 2H_2O$ on a metal basis as the metal-containing material compound were added to 900 parts of water, and the resulting mixture was heated to 90° C. and stirred for 3 hours. Thus, the resin composition (coating liquid) was prepared. The coating liquid thus prepared was applied on a corona-treated surface of a corona-treated PET substrate having a thickness of 38 μm with the use of a wire bar #18, and dried at 80° C. for 5 minutes. Thus, a double layer film including a 2.2-μm thick resin composition film layer formed on the PET substrate was produced. The resulting film was allowed to keep still under a humidity condition at 23° C. at 80% RH for 200 hours. Thus, a film of Example 1-1 was produced.

Example 1-2

A film was produced in substantially the same manner as in Example 1-1, except that the amount of $Zn(CH_3COO)_2 \cdot 2H_2O$ was 0.3 parts on a metal basis based on 100 parts of the PVA (1) and the thickness of the resin composition film layer was 3 μm. The resulting film was allowed to keep still under the same humidity condition as in Example 1-1, whereby a film of Example 1-2 was produced.

Example 1-3

A film was produced in substantially the same manner as in Example 1-1, except that the thickness of the resin composition film layer was 0.4 μm. The resulting film was allowed to keep still under the same humidity condition as in Example 1-1, whereby a film of Example 1-3 was produced.

Example 1-4

A film was produced in substantially the same manner as in Example 1-1, except that the HPMC was used instead of the PVA (1) and the thickness of the resin composition film layer was 1.7 μm. The resulting film was allowed to keep still under the same humidity condition as in Example 1-1, whereby a film of Example 1-4 was produced.

Example 1-5

A film was produced in substantially the same manner as in Example 1-1, except that the amount of $Zn(CH_3COO)_2 \cdot 2H_2O$ was 10 parts on a metal basis based on 100 parts of the PVA (1) and the thickness of the resin composition film layer was 3 μm. The resulting film was allowed to keep still under the same humidity condition as in Example 1-1, whereby a film of Example 1-5 was produced.

Comparative Example 1-1

A film was produced in substantially the same manner as in Example 1-1, except that the thickness of the resin composition film layer was 3.5 μm. The resulting film was allowed to keep still under the same humidity condition as in Example 1-1, whereby a film of Comparative Example 1-1 was produced.

[Wide Angle X-Ray Diffraction (XRD) Measurement]

The films of Examples 1-1 to 1-5 and Comparative Example 1-1 produced in the aforementioned manner were each analyzed by performing the wide angle X-ray diffraction (XRD) measurement under the following conditions:
[Measurement Conditions]
Apparatus: D8 DISCOVER (available from Bruker Japan Co., Ltd.)
Voltage: 50 kV
Electric current: 100 mA
Camera length: 150 mm
Measurement method: Reflection method
Integration period: 20 minutes As the result of the measurement, major peaks were detected at $2\theta=6.8°$, $13.5°$, $20.2°$ in diffraction patterns of the films of Examples 1-1 to 1-5. These peak positions matched with those for a layered basic zinc compound described in Inorg. Chem. 2013, 52, 95-102. Therefore, the metal compound contained in each of the films of Examples 1-1 to 1-5 was identified as the layered basic zinc compound $Zn_5(OH)_8(CH_3CO_2)_2 \cdot 2H_2O$.

Based on the diffraction position of a highest-intensity peak observed at $2\theta=6.8°$ when the films of Examples 1-1 to 1-5 were analyzed by the wide angle X-ray diffraction, the interlayer distance of the layered basic zinc compound was calculated from the Bragg equation. As a result, the layered basic zinc compound ($Zn_5(OH)_8(CH_3CO_2)_2 \cdot 2H_2O$) had an interlayer distance of 1.3 nm.

In a diffraction pattern of the film of Comparative Example 1-1, in contrast, no major peaks were detected at the same diffraction positions as those detected in the diffraction patterns of the films of Examples 1-1 to 1-5.

[X-Ray Photoelectron Spectrometry]

The resin composition film layer of each of the films of Examples 1-1 to 1-5 and Comparative Example 1-1 produced in the aforementioned manner was analyzed by means of an X-ray photoelectron spectrometer, whereby the average Zn atom concentration (%) of a portion of the film layer in a depth range of 0 to 9 nm from the surface of the film layer and the average Zn atom concentration (%) of a portion of the film layer in a depth range of 12 to 21 nm from the surface of the film layer were measured.

Measurement conditions were as follows:
[Measurement Conditions]
Apparatus: JPS-9030 (available from NDK Inc.)
Excitation X-ray source: Non-monochromatic AlKa with an output of 12 kV, 25 mA (300 W)
Analyzer mode: CAE mode (constant energy resolution mode)
Resolution EP: 50 energy steps with 1 eV
EP: 30 energy steps with 2 eV
Analysis area: φ 6 mm

[Oxygen Barrier Property]

Only the resin composition film layer was separated from each of the films of Examples 1-1 to 1-5 and Comparative Example 1-1 produced in the aforementioned manner, and the oxygen permeability of the separated film layer was measured in an environment at 23° C. at 80% RH by means of an oxygen permeability measurement apparatus (OX-TRAN100A available from MOCON Corporation).

TABLE 1

|  | Example 1-1 | Example 1-2 | Example 1-3 | Example 1-4 | Example 1-5 | Comparative Example 1-1 |
|---|---|---|---|---|---|---|
| Hydrophilic resin | PVA(1) | PVA(1) | PVA(1) | HPMC*1 | PVA(1) | PVA(1) |
| Amount of $Zn(CH_3COO)_2 \cdot 2H_2O$ on metal basis (parts)*2 | 1 | 0.3 | 1 | 1 | 10 | 1 |
| Film thickness (pm) | 2.2 | 3 | 0.4 | 1.7 | 3 | 3.5 |
| Humidity-conditioned conditions | 23° C., 80% RH 200 hours | 23° C., 80% RH 200 hours | 23° C., 80% RH 200 hours | 23° C., 80% RH 200 hours | 23° C., 80% RH 200 hours | — |
| Average Zn atom concentrations (%) | | | | | | |
| α1 in depth range of 0 to 9 nm | 25.2 | 9.78 | 3.24 | 2.35 | 35.93 | 0.28 |
| β1 in depth range of 12 to 21 nm | 0.13 | 0.03 | 0.04 | 0.22 | 31 | 0.03 |
| α1 − β1 | 25.07 | 9.75 | 3.2 | 2.13 | 4.93 | 0.25 |
| Oxygen barrier property (cc·3 μm/m²·day·atm) | 3 | 5 | 5 | 12 | 20 | >100 |

*1 Hydroxypropylmethyl cellulose
*2 Amount based on 100 parts by weight of hydrophilic resin.

As can be understood from Table 1, the resin composition film layers of the films of Examples 1-1 to 1-5 are excellent in oxygen barrier property with an oxygen permeability of not greater than 80 cc·3 μm/m²·day·atm. The resin composition film layer of the film of Comparative Example 1-1 is poorer in oxygen barrier property with an oxygen permeability of greater than 100 cc·3 μm/m²·day·atm as measured under the above conditions.

Further, the resin composition film layers of the films of Examples 1-1 to 1-5 each containing the hydrophilic resin and the metal compound and characterized in that the difference α1−β1 was not less than 1 are excellent in oxygen barrier property in the high humidity environment.

In contrast, the resin composition film layer of the film of Comparative Example 1-1 characterized in that the difference α1−β1 was less than 1 is poorer in oxygen barrier property in the high humidity environment.

Second Examples

Prior to implementation of Second Examples, the following hydrophilic resins were prepared.
[Hydrophilic Resins]
[PVA Resins]
  PVA (2-1): Unmodified PVA resin having an average polymerization degree of 300 and an average saponification degree of 99 mol %
  PVA (2-2): Unmodified PVA resin having an average polymerization degree of 450 and an average saponification degree of 98 mol %
  PVA (2-3): Unmodified PVA resin having an average polymerization degree of 400 and an average saponification degree of 88 mol %
[Polysaccharides]
  Starch (water-soluble starch DENPUN (soluble) available from Fujifilm Wako Pure Chemical Corporation)
  Hydroxypropylmethyl cellulose (HYPROMELLOSE AW-4 available from Mitsubishi Chemical Foods Corporation)

Example 2-1

First, 100 parts of the PVA (2-1) and 1 part of zinc acetate on a metal basis were added to 900 parts of water, and dissolved in the water with heating to 90° C. with stirring. After the resulting mixture was maintained at 90° C. and stirred for 3 hours, the mixture was cooled to a room temperature (23° C.). Thus, a resin composition solution was prepared. After the resin composition solution thus prepared was diluted to a solid concentration of 10% with water, a film was formed by casting the resin composition solution, and dried at 120° C. for 5 minutes in a hot air dryer. Thus, a resin composition film (having a thickness of 3 μm) of Example 2-1 was produced.

A plurality of such resin composition films were laminated together to a thickness of not less than 30 μm, and the resulting laminate was analyzed by the aforementioned method by the wide angle X-ray diffraction. As a result, a diffraction peak was observed at 2θ=6.2°.

Example 2-2

A resin composition film (having a thickness of 3 μm) of Example 2-2 was produced in substantially the same manner as in Example 2-1, except that the PVA (2-2) was used instead of the PVA (2-1) and the amount of zinc acetate was 5 parts on a metal basis. Further, the resin composition film was analyzed in the same manner as in Example 2-1 by the wide angle X-ray diffraction. As a result, a diffraction peak was observed at 2θ=6.2°.

Example 2-3

A resin composition film (having a thickness of 3 μm) of Example 2-3 was produced in substantially the same manner as in Example 2-2, except that the amount of zinc acetate was 10 parts on a metal basis. Further, the resin composition film was analyzed in the same manner as in Example 2-1 by the wide angle X-ray diffraction. As a result, a diffraction peak was observed at 2θ=6.2°.

Example 2-4

A resin composition film (having a thickness of 3 μm) of Example 2-4 was produced in substantially the same manner as in Example 2-1, except that hydroxypropylmethyl cellulose was used instead of the PVA (2-1). Further, the resin composition film was analyzed in the same manner as in Example 2-1 by the wide angle X-ray diffraction. As a result, a diffraction peak was observed at 2θ=6.2°.

Example 2-5

A resin composition film (having a thickness of 3 μm) of Example 2-5 was produced in substantially the same manner as in Example 2-1, except that starch was used instead of the PVA (2-1). Further, the resin composition film was analyzed in the same manner as in Example 2-1 by the wide angle X-ray diffraction. As a result, a diffraction peak was observed at 2θ=6.2°.

Example 2-6

A resin composition film (having a thickness of 3 μm) of Example 2-6 was produced in substantially the same manner as in Example 2-1, except that the PVA (2-3) was used instead of the PVA (2-1). Further, the resin composition film was analyzed in the same manner as in Example 2-1 by the wide angle X-ray diffraction. As a result, a diffraction peak was observed at 2θ=6.2°.

Comparative Example 2-1

A film of the PVA (2-1) (having a thickness of 3 μm) of Comparative Example 2-1 was produced in substantially the same manner as in Example 2-1, except that zinc acetate was not added. Further, the film was analyzed in the same manner as in Example 2-1 by the wide angle X-ray diffraction. As a result, no diffraction peak was observed at 2θ=2 to 15°.

Comparative Example 2-2

A film of the PVA (2-2) (having a thickness of 3 μm) of Comparative Example 2-2 was produced in substantially the same manner as in Example 2-2, except that zinc acetate was not added. Further, the film was analyzed in the same manner as in Example 2-1 by the wide angle X-ray diffraction. As a result, no diffraction peak was observed at 2θ=2 to 15°.

Comparative Example 2-3

A film of hydroxypropylmethyl cellulose (having a thickness of 3 μm) of Comparative Example 2-3 was produced in substantially the same manner as in Example 2-4, except that zinc acetate was not added. Further, the film was analyzed in the same manner as in Example 2-1 by the wide angle X-ray diffraction. As a result, no diffraction peak was observed at 2θ=2 to 15°.

Comparative Example 2-4

A film of starch (having a thickness of 3 μm) of Comparative Example 2-4 was produced in substantially the same manner as in Example 2-5, except that zinc acetate was not added. Further, the film was analyzed in the same manner as in Example 2-1 by the wide angle X-ray diffraction. As a result, no diffraction peak was observed at 2θ=2 to 15°.

Comparative Example 2-5

A film of the PVA (2-3) (having a thickness of 3 μm) of Comparative Example 2-5 was produced in substantially the same manner as in Example 2-6, except that zinc acetate was not added. Further, the film was analyzed in the same manner as in Example 2-1 by the wide angle X-ray diffraction. As a result, no diffraction peak was observed at 2θ=2 to 15°.

[Measurement of Contact Angles]

A water contact angle of each of the films of Examples 2-1 to 2-6 and Comparative Examples 2-1 to 2-5 produced in the aforementioned manner was determined by dropping 2 μL of distilled water on the film to form a water droplet on the film at 23° C. at 50% RH, measuring the contact angle of the water droplet with respect to the surface of the film by means of a contact angle meter (DropMaster 500 available from Kyowa Interface Science Co., Ltd.) ten times, and averaging the ten measurements. The average water contact angle was defined as the water contact angle (α2) of the film before the keep-still treatment. After the films were each allowed to keep still in the high humidity environment at 23° C. at 80% RH for one week, a water contact angle of each of the films was determined in the same manner as described above, and defined as the water contact angle (β2) of the film after the keep-still treatment. The results are shown below in Table 2.

[Oxygen Barrier Property]

The oxygen permeability of each of the films of Examples 2-1 to 2-6 and Comparative Examples 2-1 to 2-5 subjected to the keep-still treatment in the high humidity environment for one week was measured in an environment at 23° C. at 80% RH by means of an oxygen permeability measurement apparatus (OX-TRAN100A available from MOCON Corporation). The results are shown below in Table 2.

TABLE 2

|  | Example 2-1 | Example 2-2 | Example 2-3 | Example 2-4 | Example 2-5 | Example 2-6 |
| --- | --- | --- | --- | --- | --- | --- |
| Hydrophilic resin | PVA(2-1) | PVA(2-2) | PVA(2-2) | HPMC*[1] | Starch | PVA(2-3) |
| Amount of metal compound on metal basis (parts)*[2] | 1 | 5 | 10 | 1 | 1 | 1 |
| Contact angles (degree) |  |  |  |  |  |  |
| α2 before treatment | 34.4 | 50 | 59.1 | 60.4 | 40.9 | 47.3 |
| β2 after treatment | 90.3 | 86.2 | 84.2 | 77.6 | 76.8 | 77.6 |
| β1 − α1 | 55.9 | 36.2 | 25.1 | 17.2 | 35.9 | 30.3 |
| Oxygen barrier property (cc · 3 μm/m² · day · atm) | 3 | 5 | 5 | 20 | 50 | 5 |

TABLE 2-continued

| | Comparative Example 2-1 | Comparative Example 2-2 | Comparative Example 2-3 | Comparative Example 2-4 | Comparative Example 2-5 |
|---|---|---|---|---|---|
| Hydrophilic resin | PVA(2-1) | PVA(2-2) | HPMC*[1] | Starch | PVA(2-3) |
| Amount of metal compound on metal basis (parts)*[2] | — | — | — | — | — |
| Contact angles (degree) | | | | | |
| α2 before treatment | 33.2 | 43.4 | 61.4 | 34 | 32.4 |
| β2 after treatment | 33.2 | 42.3 | 59.7 | 34 | 40.6 |
| β1 − α1 | 0 | −1.1 | −1.7 | 0 | 8.2 |
| Oxygen barrier property (cc · 3 μm/m² · day · atm) | 90 | 130 | >200 | >200 | >200 |

*[1]HPMC: Hydroxypropylmethyl cellulose
*[2]Amount based on 100 parts of hydrophilic resin As can be understood from Table 2, the resin composition films of Examples 2-1 to 2-6 each containing the hydrophilic resin and the metal compound and characterized in that the difference between the water contact angle (β2) after the treatment in the high humidity environment for the long period of time and the water contact angle (α2) before the treatment was not less than 10 are excellent in oxygen barrier property in the high humidity environment.

In contrast, the films of Comparative Examples 2-1 to 2-5 each characterized in that the difference between the water contact angles (β2) and (α2) was less than 10 are poorer in oxygen barrier property.

While specific forms of the embodiments of the present disclosure have been shown in the aforementioned examples, the examples are merely illustrative but not limitative. It is contemplated that various modifications apparent to those skilled in the art could be made within the scope of the disclosure.

The resin composition of the present disclosure is excellent in gas barrier property, particularly in oxygen barrier property, in the high humidity environment. Therefore, the resin composition of the present disclosure is useful for packaging materials, and can be advantageously used for packaging materials, particularly, for foods, pharmaceutical products, and the like.

The invention claimed is:

1. A resin composition, comprising:
a hydrophilic resin and a metal compound, the metal compound being a lamellar metal compound represented by the following chemical formula (4):

$$M_a(OH)_b A^{n-}{}_{(2a-b)/n} \quad (4)$$

wherein:
M is a metal species,
A is ROCO,
R is an alkyl chain represented by a chemical formula $C_m H_{2m+1}$ where m=1 to 20 and optionally has a functional group,
n is an integer not less than 1, and
a and b are numbers greater than zero and satisfy an expression a/b=0.1 to 10, and satisfying the following expression (1) when being formed into a film:

$$\alpha 1 - \beta 1 \geq 1 \quad (1)$$

wherein:
α1 is an average metal atom concentration (%) in a portion of the film in a depth range of 0 to 9 nm from a film surface, and
β1 is an average metal atom concentration (%) in a portion of the film in a depth range of 12 to 21 nm from the film surface.

2. The resin composition according to claim 1, wherein the metal compound is present in an amount of 0.01 to 20 wt. % on a metal basis based on a total amount of the resin composition.

3. A film comprising the resin composition according to claim 1.

4. A multilayer structure comprising a plurality of layers, wherein at least one of the layers comprises the film according to claim 3.

5. A resin composition, comprising:
a hydrophilic resin and a metal compound, the metal compound being a lamellar metal compound represented by the following chemical formula (4):

$$M_a(OH)_b A^{n-}{}_{(2a-b)/n} \quad (4)$$

wherein:
M is a metal species,
A is ROCO,
R is an alkyl chain represented by a chemical formula $C_m H_{2m+1}$ where m=1 to 20 and optionally has a functional group,
n is an integer not less than 1, and
a and b are numbers greater than zero and satisfy an expression a/b=0.1 to 10, and satisfying the following requirement (A):
(A) when a water contact angle α2 (degrees) and a water contact angle β2 (degrees) of a film formed by casting a 10 wt. % aqueous solution or aqueous dispersion of the resin composition are respectively determined before and after the cast film is allowed to keep still in an environment at 23° C. at 80% RH for one week, the water contact angle α2 and the water contact angle β2 satisfy the following expression (2):

$$(\beta 2 - \alpha 2) \geq 10 \quad (2)$$

6. The resin composition according to claim 5, wherein the metal compound is present in an amount of 0.01 to 20 wt. % on a metal basis based on a total amount of the resin composition.

7. A film comprising the resin composition according to claim 5.

8. A multilayer structure comprising a plurality of layers, wherein at least one of the layers comprises the film according to claim 7.

9. A resin composition, comprising:
a hydrophilic resin and a metal compound, the metal compound being a lamellar metal compound represented by the following chemical formula (4);

$$M_a(OH)_b A^{n-}{}_{(2a-b)/n} \quad (4)$$

wherein:
- M is a metal species,
- A is ROCO,
- R is an alkyl chain represented by a chemical formula $C_mH_{2m+1}$ where m=1 to 20 and optionally has a functional group,
- n is an integer not less than 1, and
- a and b are numbers greater than zero and satisfy an expression a/b=0.1 to 10, and having an oxygen permeability (cc·3 μm/m²·day·atm) satisfying the following expression (3) as measured in an environment at 23° C. at 80% RH, when being formed into a film:

$$\text{Oxygen permeability } (cc\cdot 3 \text{ μm/m}^2\cdot\text{day}\cdot\text{atm}) \leq 80 \qquad (3).$$

10. The resin composition according to claim 9, wherein the metal compound is present in an amount of 0.01 to 20 wt. % on a metal basis based on a total amount of the resin composition.

11. A film comprising the resin composition according to claim 9.

12. A multilayer structure comprising a plurality of layers, wherein at least one of the layers comprises the film according to claim 11.

* * * * *